United States Patent [19]

Kumar et al.

[11] Patent Number: 5,375,242
[45] Date of Patent: Dec. 20, 1994

[54] COMPILER ARCHITECTURE FOR CROSS-MODULE OPTIMIZATION

[75] Inventors: Rajiv Kumar, Santa Clara; Paul Chan, Cupertino, both of Calif.

[73] Assignee: Hewlett-Packard Company, Palo Alto, Calif.

[21] Appl. No.: 128,385

[22] Filed: Sep. 29, 1993

[51] Int. Cl.$^5$ .............................................. G06F 9/45
[52] U.S. Cl. ............................. 395/700; 364/DIG. 1; 364/280.5
[58] Field of Search ................................... 395/700; 364/DIG. 1 MS File

[56] References Cited

U.S. PATENT DOCUMENTS

| | | | |
|---|---|---|---|
| 4,667,290 | 5/1987 | Goss et al. | 395/700 |
| 5,175,856 | 12/1992 | Van Dyke et al. | 395/700 |
| 5,193,191 | 3/1993 | McKeeman et al. | 395/700 |
| 5,230,050 | 7/1993 | Iitsuka et al. | 395/700 |
| 5,280,613 | 1/1994 | Chan et al. | 395/700 |

*Primary Examiner*—Thomas M. Heckler
*Attorney, Agent, or Firm*—Alan H. Haggard; Roland I. Griffin

[57] ABSTRACT

An improved compilation and linkage system for use in operating a computer to generate a cross-module optimized executable code file from a plurality of source files and object files. The source files are compiled to intermediate code files using a compiler sub-system. In the preferred embodiment of the present invention, the intermediate code files consist of intermediate language instructions that can be optimized for execution on a predetermined computer and a global symbol table. The compiler sub-system can also be used to generate conventional object code files if desired. A linkage sub-system is then used to cross-module optimize the code in a plurality of intermediate code files and link the resultant object code with any other object code files to generate the executable code file for execution on the computer in question. To the programmer, the operation of the compiler and linkage sub-systems of the present invention is essentially indistinguishable from that of a conventional compiler and linkage sub-system that lacks cross-module optimization.

6 Claims, 1 Drawing Sheet

COMPILER ARCHITECTURE FOR CROSS-MODULE OPTIMIZATION

FIELD OF THE INVENTION

The present invention relates to compilers for use on computers, and more particularly, to a compiler design that makes certain optimization tasks transparent to the user.

BACKGROUND OF THE INVENTION

Computer programs are usually broken into a number of modules. Each module typically contains the code for one or more procedures used in the program. Some of the modules may be provided by outside sources and be available only in object code. Some modules may contain source code that facilitates the implementation of certain classes of programs. The remaining code may be broken into a plurality of modules simply to reduce the amount of material that must be compiled or edited in any one operation.

Prior to the execution of the program, the code in the various modules must be compiled. Typically, the compiler converts each module having a source code therein into an object code module. The object code modules are then linked together to generate the final executable program. To simplify this process, many systems provide "MAKE" utilities that keep track of the modules used in a given program and generate the final executable code. The MAKE program, when invoked, checks to see which modules have been modified since the last compilation thereof and recompiles the modified source code modules prior to invoking the linker.

The speed with which a given program executes on a particular computer can be significantly increased by using various forms of code optimization. For example, variables that are used frequently throughout the program may be allocated to registers within the CPU rather than left in memory. Similarly, if a subroutine is particularly small, the optimizer may replace calls to the subroutine by inline code. Programs for providing the optimization are known to those skilled in the art. For the purposes of the present discussion, it is sufficient to note that the degree of improvement provided by the optimization procedures increases with the amount of information available to the optimization program. For example, an optimizer cannot inline code if it does not have access to the subroutine in question because the subroutine is in a module that is not available to the optimizer. As a result, it is advantageous to perform optimization across as many modules as possible.

While the division of the code into a number of modules simplifies some tasks, it limits the scope of optimization to a single module. Once the source code has been compiled to object code, many forms of optimization are no longer available. Hence, the optimizer must operate on a source level code and have as many modules available to it as possible.

One prior method for providing optimization is to compile the source code modules to an intermediate code format and then optimize all of the intermediate code modules together. The intermediate code is a machine independent code. The optimizer generates an object code file which is then linked with other object code files to generate the executable code.

While this methodology allows the user to optimize his or her code, it has the disadvantage of requiring the user to learn a new system. The intermediate code files are generated by a separate compiler. In addition, the optimizer requires the user to use a new utility that operates only on the intermediate code files. The output of this utility must then be given to the conventional linker to provide the executable code. Each new program that the user must learn places a significant burden on the user. In addition, the probability that the user will err in using the system increases as the number of steps increases.

Broadly, it is the object of the present invention to provide an improved optimizing compiler.

It is a further object of the present invention to provide a compiler architecture that is transparent to the user.

These and other objects of the present invention will become apparent to those skilled in the art from the following detailed description of the invention and the accompanying drawings.

SUMMARY OF THE INVENTION

The present invention is an improved compilation and linkage system for use in operating a computer to generate an executable code file by optimizing procedures across a plurality of source files and object files. The source files are compiled to intermediate code files using a compiler sub-system. In the preferred embodiment of the present invention, the intermediate code files include intermediate language instructions that can be optimized for execution on a predetermined computer and a global symbol table. A linkage sub-system is then used to optimize the code across all modules in a plurality of intermediate code files and link the resultant machine object code with any other object code files to generate the executable code file for execution on the computer in question.

DETAILED DESCRIPTION OF THE INVENTION

Figure 1:
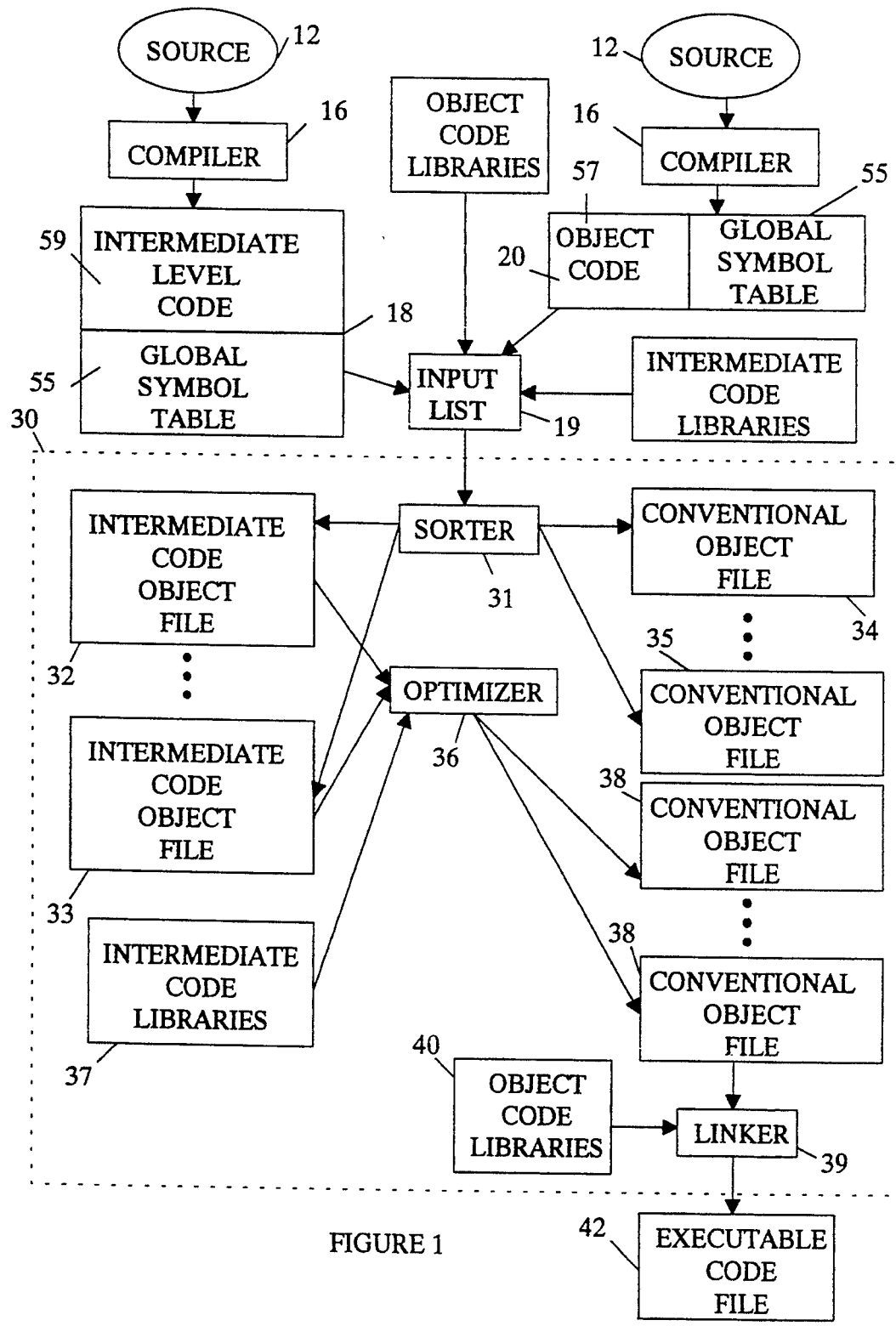
FIG. 1 illustrates the manner in which the present invention is used to compile a computer program having several source file modules.

The present invention provides a compiler architecture in which the cross-module optimization is hidden from the user. At most, the user indicates to the compiler that a given module is available for optimization with procedures in other currently unknown modules. The compiler generates output files that appear to be conventional object code files. Each file includes a global symbol table which allows all the language tools to view the files as normal object files. The file names also match those used for object files, i.e., the files are named with a ".o" suffix. Adherence to the same naming suffix as used in object files provides complete transparency to various development tools such as "MAKE" which recognize and act on the suffix. The files differ from object files in that they contain intermediate code instead of object code.

The linker of the present invention has the ability to distinguish between intermediate code object files and conventional object files. When the linker receives a list of files, it sorts these into intermediate code files and conventional object files. The intermediate code files are then cross-module optimized as a group and corresponding object code files are generated which are linked with the remaining object code files.

From the user's perspective, the optimization is invisible. The user specifies the object files that are to be linked to the linker. The linker does the rest. At most, the user specifies that a given module is to be compiled to an intermediate code object file when the user specifies a compiler option indicating that cross-module optimization is to be carried out.

Refer now to FIG. 1 which illustrates the manner in which the present invention is used to cross-module optimize a program having several source modules 12. The compiler 16 either compiles each source module to an intermediate code object file 18 or a conventional object code file 20 depending on one of the input parameters to the compiler provided by the user. In one embodiment of the present invention, compiler 16 has a default value for this parameter which results in all source files being compiled to intermediate code object files. In this embodiment, the cross-module optimization is completely transparent to the user in that all of the files provided by the user are optimized. Files obtained in conventional object code form will, of course, not be optimized.

As noted above, the intermediate code object files and conventional object code files are indistinguishable from the user's point of view. Both types of files have global symbol tables 55 in formats that are recognized by other language tools in the compilation system. In addition, both types of files have the same naming convention. The intermediate code object files differ from the conventional object code files in that an additional code section 59 having the intermediate level code has been added.

The intermediate level code is preferably a language which is independent of the details of the machine architecture on which the executable code is to run. In the preferred embodiment of the present invention, the intermediate level code consists of instructions that may be implemented on any general computer. In addition, the intermediate level code is preferably a language into which other compiler languages can be readily translated. This provides a means for combining source modules written in a number of different languages into optimized object code without requiring an optimizer for each source language. Only the optimizer need know the actual machine architecture.

When all of the source files have been converted either to intermediate code object files or conventional object code files, the files are input to a linkage subsystem 30. Linkage sub-system 30 typically receives a list 19 of the files that are to be linked to generate an executable code file 42. Linkage sub-system 30 may also receive a list of library files such as libraries 37 and 40. The manner in which the linkage sub-system is invoked is preferably identical to the method of invoking the linking system in the absence of cross-module optimization. Linkage sub-system 30 includes a sorter 31 which examines each of the files in the input list and determines whether the file is an intermediate code object file or a conventional object code file. Since each intermediate code file has a global symbol table, the intermediate code files can also be placed in a library similar to that used with respect to regular object files. The linker can use the symbol table to search a library of intermediate code files to extract only those intermediate code modules needed for a given executable. The intermediate code object file files are accumulated and treated as a group for the purpose of cross-module optimization. Typical intermediate code object files are shown at 32 and 33. Processing of the conventional object code file files is postponed until after the intermediate code object file files have been processed. Typical conventional object code files are shown at 34 and 35.

After all of the input files have been sorted, an optimizer 36 processes the intermediate code object files. Optimizer 36 performs such cross-module interprocedural optimizations as inlining of code. To aid optimizer 36, intermediate code libraries are provided in the preferred embodiment of the present invention. The intermediate code libraries are also in the intermediate code, and hence, the modules selected from these libraries may be optimized together with the intermediate code object files. Optimizer 36 generates a temporary conventional object code file 38 for each intermediate code object file. However, the content of these object files may be very different from those generated by a conventional compiler since cross-module optimization has been performed.

Once optimizer 36 has generated conventional object code files 38, a conventional linker 39 is used to link all of the conventional object code files to generate executable code file 42. A conventional object code library may be used in conjunction with linker 39.

In another embodiment of the present invention, the intermediate code files contain a conventional object code file. In this embodiment, the intermediate code files include one additional section having the intermediate code stored therein. These intermediate code files also include the object code. If cross-module optimization has been specified, the linker uses the intermediate code section to provide the cross-module optimization. If, on the other hand, cross-module optimization is not specified, the linker operates on the object code sections in the conventional manner. In this embodiment, the intermediate code files appear to be conventional object code files to all of the systems that operate on conventional object code files.

Various modifications to the present invention will become apparent to those skilled in the art from the foregoing description and accompanying drawings. Accordingly, the present invention is to be limited solely by the scope of the following claims.

What is claimed is:

1. A method for operating a computer to generate an optimized executable code file from a plurality of source files and optionally one or more previously compiled object code files, each said previously compiled object code file including a global symbol table, said method comprising the steps of:

compiling at least two of said source files to generate intermediate code files using a compiler sub-system, said intermediate code files comprising intermediate language instructions that can be optimized for execution on a predetermined computer; and inputting said intermediate code files and said optional previously compiled files to a linkage sub-system, said linkage sub-system comprising a code optimizer for optimizing the code in all of the intermediate code files input to said linkage sub-system as a group and generating one or more object code files therefrom; and a code linker for linking said object code files with said optional previously compiled object code files generating therefrom an executable code file for execution on said predetermined computer, said linkage sub-system further comprising means for distinguishing said intermediate code files from said previously compiled object code files and means for preventing said previously compiled object code files from being input to said code optimizer.

2. The method of claim 1 wherein each of said object code files generated by said linkage sub-system includes a global symbol table rand wherein each of said intermediate code files generated by said compiling sub-system includes a global symbol table which is indistinguishable from the global symbol table that would be generated by said linkage sub-system from said intermediate code file if said intermediate code file were input to said linkage sub-system.

3. The method of claim 1 wherein said intermediate code files comprise a plurality of code sections, wherein said object files also include a plurality of object code sections and wherein there is one said code section in said intermediate code files corresponding to each said object code section in an object code file.

4. The method of claim 1 wherein said linkage sub-system further comprises a library having a plurality of modules compiled in said intermediate language instructions.

5. The method of claim 1 wherein said compiler sub-system also includes code for compiling a source file to generate an object code file therefrom.

6. The method of claim 5 wherein said intermediate code files have names that are indistinguishable from said object code files.

* * * * *